(12) United States Patent
Okada et al.

(10) Patent No.: US 7,498,098 B2
(45) Date of Patent: Mar. 3, 2009

(54) METHOD FOR PRODUCING POSITIVE CATHODE MATERIAL FOR LITHIUM BATTERY, AND LITHIUM BATTERY

(75) Inventors: Shigeto Okada, Fukuoka (JP); Jun-ichi Yamaki, Kasuga (JP); Yike Chen, Qunzhou (CN); Takafumi Yamamoto, Kasuga (JP); Naoki Hatta, Ichihara (JP)

(73) Assignees: Japan as Represented by President of the University of Kyusyu, Fukuoka (JP); Mitsui Engineering & Shipbuilding Co., Ltd., Tokyo (JP)

( * ) Notice: Subject to any disclaimer, the term of this patent is extended or adjusted under 35 U.S.C. 154(b) by 0 days.

(21) Appl. No.: 10/531,191

(22) PCT Filed: Oct. 17, 2003

(86) PCT No.: PCT/JP03/13315

§ 371 (c)(1),
(2), (4) Date: Dec. 12, 2005

(87) PCT Pub. No.: WO2004/036672

PCT Pub. Date: Apr. 29, 2004

(65) Prior Publication Data

US 2006/0127750 A1    Jun. 15, 2006

(30) Foreign Application Priority Data

Oct. 18, 2002    (JP)    ............ 2002-303932

(51) Int. Cl.
*H01M 4/58*    (2006.01)
(52) U.S. Cl. .................................. 429/122
(58) Field of Classification Search ............. 429/221, 429/232, 122, 231.95; 252/182.1, 62.2
See application file for complete search history.

(56) References Cited

U.S. PATENT DOCUMENTS

2002/0182497 A1* 12/2002 Kohzaki et al. ............ 429/221
2004/0033360 A1*  2/2004 Armand et al. ............ 428/408

* cited by examiner

*Primary Examiner*—Patrick Ryan
*Assistant Examiner*—Monique Wills
(74) *Attorney, Agent, or Firm*—Priest & Goldstein, PLLC

(57) ABSTRACT

A method for producing a cathode material for a lithium battery, characterized in that it comprises admixing a compound liberating a phosphate ion in a solution and metallic iron, and dissolving the metallic iron, followed by firing, thereby synthesizing ferric phosphate. The above method further comprising reacting a raw material mixture while grinding it down or refluxing can produce ferric phosphate cathode material having a fine particle diameter and exhibiting high activity, through a precursor before firing having a fine particle diameter.

5 Claims, 10 Drawing Sheets

METHOD FOR PRODUCING POSITIVE CATHODE MATERIAL FOR LITHIUM BATTERY, AND LITHIUM BATTERY

TECHNICAL FIELD

The present invention relates to a method for producing a cathode material for a lithium battery and to a lithium battery (primary or secondary battery) using the cathode material as a constituent component. More specifically, the present invention relates to a method for producing a cathode material ($FePO_4$) for primary and secondary batteries such as metal lithium battery, lithium ion battery and lithium polymer battery using an alkali metal such as lithium or an alloy or compound thereof as an anode active material and to a lithium primary or secondary battery using the cathode material produced by the method.

BACKGROUND ART

Primary and secondary batteries such as lithium battery, lithium ion battery and lithium polymer battery using an alkali metal such as lithium or an alloy or compound thereof as an anode active material are attracting attention in recent years because of their large capacities. The cathode material for use in such primary and secondary batteries is subjected to electrode oxidation/reduction accompanied by doping/undoping of ions of an alkali metal such as lithium during the process of charging and discharging. As the cathode material, the ferric phosphate ($FePO_4$) having a trigonal $P_{321}$ crystalline structure is well-known in the prior art (Japanese Patent No. 3126007).

Although Japanese Patent No. 3126007 discloses a method for obtaining ferric phosphate anhydride by heat treatment of ferric phosphate hydrate ($FePO_4 \cdot nH_2O$), there in no description of the method for synthesizing ferric phosphate hydrate.

An example in which a $FePO_4$ cathode active material having a trigonal $P_{321}$ structure was synthesized from $NH_4H_2PO_4$ and $Fe(NH_4)_2(SO4)_2 \cdot 6H_2O$ at a temperature of 650° C. has been reported [P. P. Prosini et al, J. Electrochem. Soc., 140, A297 (2002)] has been reported. However, the material has as low a capacity as 40 mAh/g.

Conventionally, ferric phosphate hydrate as a calcination precursor is synthesized by, for example, mixing a solution containing a tervalent iron such as a solution of iron (III) sulfate or ferric chloride (or a hydrate thereof) with an alkaline compound containing phosphate ions such as disodium hydrogenphosphate, allowing the reaction mixture to stand under an elevated temperature, and filtering the precipitate. The ferric phosphate hydrate, however, is not suitable for a material of cathode for a secondary battery because nonvolatile elements such as sodium ions tend to remain as impurities. That is, in the synthesis method, it is necessary to remove sodium ions and so on from the calcination precursor by filtering. The process is cumbersome and may bring the entry of impurities. To complete the filtering and increase the purity of the calcination precursor, it is preferred to allow the crystals of ferric phosphate hydrate precipitate to grow until they reach a large diameter (about 10 µm or greater). However, when ferric phosphate hydrate particles having a large diameter are calcined, the resulting ferric phosphate particles have a large diameter and have low activity as a cathode material. It is known that the performance of a cathode material is largely affected by the size, shape and specific surface area of the particles thereof and impurities therein.

It is, therefore, an object of the present invention to provide a method for producing a cathode material by which ferric phosphate suitable as a cathode material for lithium batteries such as lithium primary and secondary batteries can be synthesized reliably and easily, and to provide a high-performance lithium battery primary or secondary battery) using the cathode material obtained by the method.

DISCLOSURE OF THE INVENTION

In order to solve the above problem, the first aspect of the present invention is a method for producing a cathode material for a lithium battery, including the steps of mixing a compound which releases phosphate ions in a solution with metal iron to cause dissolution and reaction of the metal iron, and calcining the reaction mixture to synthesize ferric phosphate.

According to the method for producing a cathode material for a lithium battery, a cathode material (that is, ferric phosphate as a cathode active material) can be synthesized from stoichiometric amounts of ingredients reliably and easily. Also, the reaction of "a compound which releases phosphate ions in a solution" with metal iron can be carried out in an aqueous solution and is thus easy to handle. Further, since the iron of the cathode material, unlike that of an olivine-type (Pnma crystal structure) lithium iron (II) phosphate known as another cathode material, is oxidized to Fe+3 by calcination, the calcination can be carried out in the presence of air. Thus, the calcination process requires no special conditions such as a reducing atmosphere of hydrogen and is thus easy to carry out.

The second aspect of the present invention is a method for producing a cathode material for a lithium battery, including the steps of reacting a compound which releases phosphate ions in a solution with metal iron while grinding the mixture in an aqueous solution, and calcining the reaction mixture to synthesize ferric phosphate.

According to the method for producing a cathode material for a lithium battery, ferric phosphate as a cathode material (cathode active material) can be synthesized from ingredients at a stoichiometric ratio reliably and easily. Also, the reaction of "a compound which releases phosphate ions in a solution" with metal iron can be carried out in an aqueous solution and is thus easy to handle. In addition, since the ingredient mixture is ground during the reaction, the reaction can be accelerated Further, since iron of the cathode material of the present invention, unlike that of an olivine-type lithium iron(II) phosphate known as another cathode material, is oxidized to Fe+3 by calcination, the calcination can be carried out in the presence of air. Thus, the calcination process requires no special condition such as a reducing atmosphere of hydrogen and is thus easy to carry out.

The third aspect of the present invention is the method for producing a cathode material for a lithium battery according to the first or second aspect, in which the compound which releases phosphate ions in a solution is phosphoric acid, phosphorous pentoxide, or ammonium dihydrogenphosphate.

According to the method for producing a cathode material for a lithium battery, there can be obtained the effect, in addition to the effect of the first or second aspect, that impurities can be removed by the calcination process since no nonvolatile element such as sodium is contained in the ingredients, and ferric phosphate almost free of impurities can be synthesized from a stoichiometric mixture of the ingredients. Thus, the ferric phosphate produced by the method can be suitably used as a cathode material for a lithium battery. Also, the ingredients, which are primary materials or materials of the kind of phosphoric acid and iron, are relatively inexpensive, easily available in high purity form and easy to handle, and thus suitable for large-scale production.

The fourth aspect of the present invention is a method for producing a cathode material for a lithium battery, including the steps of adding a conductive carbon to the cathode material produced by a method according to any one of the first to third aspects, and pulverizing and mixing the mixture. According to the fourth aspect, since the ferric phosphate particles as a cathode material are coated and combined with carbon, the lithium battery using the cathode material can be provided with an improved discharge capacity and higher performance.

The fifth aspect of the present invention is a lithium battery using a cathode material produced by the method according to any one of the first to fourth aspects as a constituent component. The lithium battery using the cathode material produced by the method of the present invention exhibits high performance since the cathode material has excellent electrochemical properties.

BEST MODE FOR CARRYING OUT THE INVENTION

Figure 1:
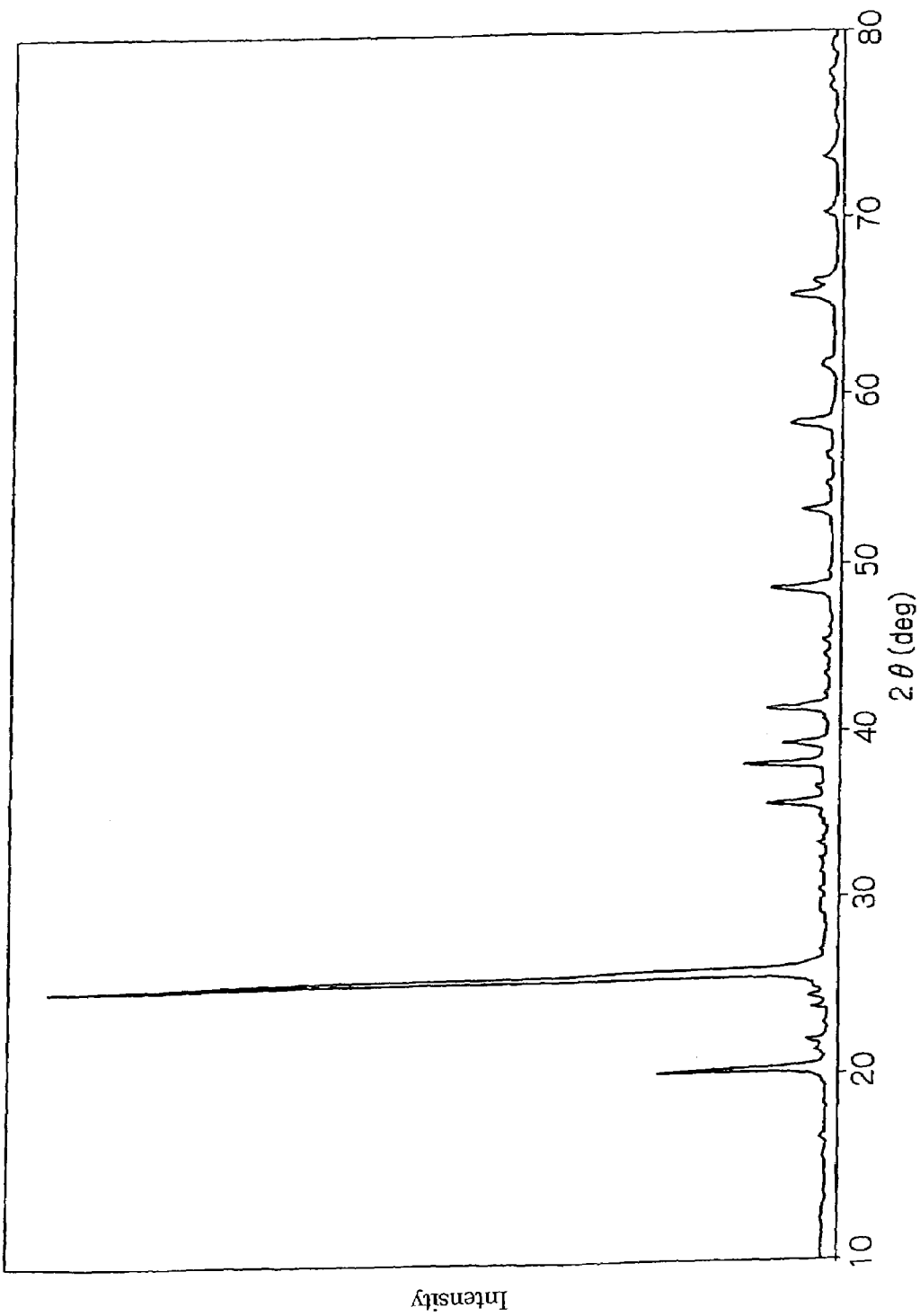
FIG. 1 is a graph showing the result of X-ray diffraction analysis of a cathode material obtained in Example 1.

The method for producing a cathode material for a lithium battery of the present invention is practiced by reacting a compound which releases phosphate ions in a solution with metal iron in an aqueous solution while grinding the mixture and calcining the reaction product.

<Cathode Material>

The cathode material obtained by the method of the present invention is ferric phosphate represented by the general formula $FePO_4$. Ferric phosphate, which can be synthesized by reacting ingredients and calcining the reaction product in the presence of air (in an oxidizing atmosphere), has a trigonal crystal structure with point group $P_{321}$ and can be used as a cathode material for a lithium battery which can be repeatedly charged and discharged by insertion and extraction of negative metal ions such as lithium ions.

The ingredients of ferric phosphate as the cathode material of the present invention are a compound which releases phosphate ions in a solution and metal iron. The amounts of the ingredients are preferably adjusted according to the stoichiometric ratio so that the mole ratio of P and Fe can be 1:1.

Examples of the compound which releases phosphate ions in a solution include but are not specifically limited to phosphoric acid ($H_3PO_4$), phosphorous pentoxide ($P_2O_5$), ammonium dihydrogenphosphate ($NH_4H_2PO_4$), and diammonium hydrogenphosphate [$(NH_4)_2HPO_4$]. Among these, phosphoric acid, phosphorous pentoxide, ammonium dihydrogenphosphate are preferred since the iron is preferably kept under relatively strong acidic conditions during the process of dissolving.

When phosphoric acid is used as the ingredient, since phosphoric add is usually available in the form of aqueous solution, it is preferred to measure the phosphoric acid concentration (purity) precisely by titration or the like before use. The metal iron is preferably in the form of fine particles (with a diameter of 200 μm or smaller, preferably 150 μm or smaller, more preferably 100 μm or smaller) so that the reaction can be accelerated.

In the present invention, ferric phosphate as a cathode material for a lithium battery can be easily obtained from a primary material such as metal iron or the like as described above. Also, since the ingredients contain no nonvolatile element such as sodium, impurities can be completely removed only by calcination without cumbersome processes such as filtering, and ferric phosphate almost free of impurities can be synthesized.

The reaction of the "compound which releases phosphate ions in a solution" with metal iron can be carried out by, for example, adding metal iron to an aqueous solution of the "compound which releases phosphate ions in a solution" that water is added as appropriate. In the reaction, it is necessary to fully dissolve the metal iron. In order to dissolve the metal iron, grinding and/or heating refluxing or the like), for example, may be performed That is, the process of reacting the "compound which releases phosphate ions in a solution" with metal iron is preferably carried out by fully mixing and grinding the mixture of ingredients in an automatic grinding machine, ball mill or beads mill and/or heating the mixture of the ingredients by means of reflux or the like.

By grinding the mixture of ingredients, a shear force is applied to the metal iron and the surfaces thereof are renewed, accelerating the reaction. Hydrogen generated during the grinding process is preferably removed as appropriate. After the completion of the reaction, when the reaction product is dried, fine particles of ferric phosphate hydrate (with a diameter of about 1 μm or smaller) can be obtained. When the fine particles of ferric phosphate hydrate are calcined, fine particles of a ferric phosphate cathode material with high activity can be obtained. To complete the reaction more fully, the reaction product may be irradiated with ultrasonic waves. During the grinding process, when the generation of hydrogen in the initial stage decreases and the reaction is decelerated, the reaction is preferably carried out in the presence of air or in an oxidizing atmosphere containing oxygen to expel hydrogen.

Also, when the reactants are heated, the dissolving reaction of the metal iron is accelerated and the yield of the cathode material can be improved. Heating by refluxing or the like is preferably carried out in air to promote oxidation of the iron. Refluxing is considered to be suitable for large-scale production since there is no need for a mechanical pulverizing process, which is relatively difficult to perform in a large scale.

When the reaction is carried out in the presence of a reaction accelerator, e.g. a volatile oxidizing agent such as hydrogen peroxide, oxygen, halogen such as bromine or chlorine, oxidized halogen such as bleaching powder or hypochlorous acid, or a volatile acid such as oxalic acid or hydrochloric acid, the reaction of the compound which releases phosphate ions in a solution with metal iron may be accelerated and completed in a short period of time. However, when oxygen or oxidizing agent is added, since there is a danger of ignition, it is preferred to take precautions against explosion and control the vapor phase composition so that the concentration of it can be kept lower than the explosion limit.

The addition of an oxidizing agent has the effect of converting generated bivalent iron ions to tervalent iron ions as well as allows the metal iron to react with the compound which releases phosphate ions in a solution and to dissolve (usually, as bivalent iron ions), so that no bivalent iron can remain in the ferric phosphate cathode material produced by the calcination process after that. An acidic reaction accelerator such as hydrochloric acid or oxalic acid has the effect of accelerating the hydrogen generating dissolving reaction of iron. Addition of a volatile reaction accelerator which is both oxidative and acidic such as nitric acid is also effective. Since the oxidizing agent and reaction accelerator are removed by the calcination process, there is no possibility that they can remain in the cathode material.

By calcination of the reaction product of the compound which releases phosphate ions in a solution and metal iron, ferric phosphate as the cathode material is produced. The calcination is carried out in a calcination process at temperatures ranging from 100 to 900° C. as generally employed under calcination conditions of suitable temperature range and treatment time. The calcination is preferably carried out in an oxidizing atmosphere containing oxygen such as air to promote oxidation of iron.

The calcination carried out by, for example, a one-stage calcination process including the steps of raising the temperature from room temperature to the calcination completion temperature (for example, about 100 to 900° C., preferably about 500 to 700° C. from the viewpoint of removing water in the cathode material, more preferably about 650° C.) and keeping the temperature.

When the calcination is carried out at a low temperature of about 100 to 500° C. (this process will be hereinafter referred to as "low-temperature calcination"), most of the ferric phosphate is in an amorphous state. When the calcination is carried out at a high temperature of about 600 to 900° C. (this process will be hereinafter referred to as "high-temperature calcination"), most of the ferric phosphate has a crystal structure with point group $P_{321}$. When the calcination is carried out at a temperature in the range of 500 to 600° C. (this process will be hereinafter referred to as "intermediate-temperature calcination"), in which transformation from the amorphous phase to the crystal structure with point group $P_{321}$ occurs, the proportion of amorphous phase decreases and ferric phosphate having a crystal structure with point group $P_{321}$ gradually increases as the calcination temperature is higher, and the crystal structure with point group $P_{321}$ becomes dominant when the calcination temperature is higher than 600° C. as described above.

When the electrochemical characteristics of the amorphous ferric phosphate obtained by low-temperature calcination, ferric phosphate having the crystal structure with point group $P_{321}$ obtained by high-temperature calcinations, and ferric phosphate in which amorphous phase and the crystal structure with point group $P_{321}$ coexist obtained by intermediate-temperature calcination are compared, all of them exhibit relatively good discharge characteristics as described in Example 4 described later. The ferric phosphate obtained by low- or intermediate-temperature calcination shows a discharge curve which is similar to that of the ferric phosphate obtained by high-temperature calcination although amorphous phase exists in them. This suggests that the local fine structure of the ferric phosphates is similar to the crystal structure with point group $P_{321}$.

Thus, in the present invention, any of the low-, intermediate-, and high-temperature calcination can be selected, or the calcination temperature can be set in a low-intermediate temperature range (100 to 600° C., for example) or an intermediate-high temperature range (500 to 900° C., for example) depending on the ferric phosphate to be obtained. When the ferric phosphate is used in a non-aqueous electrolyte battery such as a lithium battery, since the cathode material preferably does not contain residual water, high-temperature calcination is preferred from the viewpoint of removing water completely.

The calcination is not limited to the one-stage calcination. The calcination may be carried out in two stages, that is, a calcination step in a lower temperature range (generally, in a range of room temperature to 300 through 400° C.; which may be hereinafter referred to as "preliminary calcination") and a calcination step in a higher temperature range (generally, in a range of room temperature to the calcination completion temperature (about 500 to 800° C., preferably about 500 to 700° C., more preferably about 650° C.); which may be hereinafter referred to as "final calcination"). In such a case, it is preferred that the reaction product of a compound which releases phosphate ions in a solution and metal iron is preliminarily calcined in the preliminary calcination step to obtain a calcination precursor and the calcination precursor is kept in the above temperature range for about 5 to 24 hours in the final calcination step. The reaction product may be dried and/or pulverized as needed prior to the preliminary calcination, and the calcination precursor may be pulverized and/or ground prior to the final calcination. The one-stage calcination and the process including the preliminary and final calcination may be both referred simply to as "calcination."

As has been described above, according to the method of the present invention, there is no need for a cumbersome filtering process in the synthesis of the calcination precursor (ferric phosphate hydrate). Also, there is no possibility of impurities remaining after the calcination, and a cathode material almost free of impurities can be synthesized reliably. In addition, the ingredients, which are primary materials or materials of the kind, are easy to handle and inexpensive and thus suitable for large-scale production.

When conductive carbon is added to the cathode material obtained as described above and the mixture is mixed and ground for 12 to 36 hours in, for example, a ball mill, a carbon composite cathode material including cathode material particles coated with carbon can be obtained. One example of the conductive carbon is carbon black such as acetylene black.

When combined with carbon, the $FePO_4$ cathode material has significantly improved in discharge capacity as compared with the $FePO_4$ cathode material not combined with carbon as shown in Example 5 described later. That is, the combination with carbon improves the surface conductivity of the $FePO_4$ cathode material as a cathode active material and significantly enhances the utilization ratio of the positive active material. Thus, the combination with carbon is effective to improve the performance of a lithium battery using $FePO_4$ as a cathode active material when carried out appropriately.

<Lithium Battery>

Examples of the lithium battery using the cathode material according to the present invention obtained as described above include secondary batteries such as metal lithium battery, lithium ion battery and lithium polymer battery. The lithium battery of the present invention can be used as a primary battery which is only discharged.

The basic structure of a lithium battery will be described taking a metal lithium battery using metal lithium as the anode material as an example. A lithium metal battery is a secondary battery characterized in that lithium ions move back and forth between the cathode and anode during charge and discharge by dissolution into the electrolyte and deposition on the anode of metal lithium.

As the anode material, a compound containing lithium in the initial state and having a central element in a reduced form such as lithium containing alloys such as lithium—aluminum alloys, lithium—titanium composite oxides (e.g., $Li[Li_{4/3}Ti_{5/3}O_4]$), and lithium-transit metal composite nitride (e.g., $Li_7MnN_4$, $Li_3FeN_2$, etc.) as well as metal lithium as used in metal lithium batteries can be used.

As the electrolyte, a liquid electrolytes prepared by dissolving an electrolyte substance such as $LiPF_6$, $LiBF_4$, $LiClO_4$, $LiCF_3SO_3$, $LiN(CF_3SO_2)_2$, or $LiC(CF_3SO_2)_3$ in a mixed solvent of a cyclic organic solvent such as ethylene carbonate, propylene carbonate, butylene carbonate or γ-butyrolactone and a chain organic solvent such as dimethyl carbonate, ethyl methyl carbonate, diethyl carbonate or dimethoxyethane; a gel polymer electrolyte in which a liquid electrolyte as above and a polymeric gel substance such as polyethylene oxide, polypropylene oxide, polyacrylonitrile or polyvinylidene fluoride coexist; or a crosslinked polymer electrolyte prepared by chemical crosslinking of a gel polymer electrolyte as above can be used. When the anode material is metal lithium, the use of a gel polymer electrolyte or crosslinked polymer electrolyte which can suppress the growth of dendrite which is deposited during charge is preferred. When a liquid electrolyte is used, the cathode and the anode are insulated from each other by interposing therebetween a separator made of a polyolefin such as polyethylene or polypropylene to prevent short-circuiting between them.

The cathode and anode are respectively prepared by adding a conductivity imparting agent, such as carbon black, in such an amount that the effects of the cathode and anode are not impaired and a binder such as a fluorine-type polymer, e.g., polytetrafluoroethylene or polyvinylidene fluoride; polyimide or polyolefin to the cathode or anode material, mixing and kneading the mixture with a polar organic liquid as needed, and forming the kneaded mixture into a sheet. Then, current collection is conducted using a metal foil or metal screen to construct a battery. When metal lithium is used for the anode, transitions between Li(0) and $Li^+$ take place upon charging and discharging, and a battery is thereby formed.

The secondary battery of the present invention produced by the above method can exhibits high performance since the cathode material has excellent electrochemical properties. Especially, when the cathode material is used in a metal lithium battery using metal lithium for the anode, the battery exhibits good battery performance.

Although the following Examples will further described the present invention in more detail, the present invention shall not be limited by these Examples.

EXAMPLE 1

(1) Preparation of Cathode Material

A cathode material ($FePO_4$) was synthesized by the following procedure.

An ingredient mixture of 6 g of iron powder (product of Wako Pure Chemical Industries, Ltd.; under 150 μm, purity: 85% or higher), 12.385 g of phosphoric acid (product of Wako Pure Chemical Industries, Ltd.; 85% aqueous solution) and 50 cc of water were mixed and ground in a ball mill (at a rotational speed of 200 rpm) for one day, and the reaction mixture was dried at 95° C. for one day to obtain a calcination precursor. After pulverization, the calcination precursor was placed in an alumina crucible and calcined at temperatures between 550 to 775° C. under the presence of air for 8 hours. A cathode material obtained by calcination at 650° C. was identified as single-phase ferric phosphate ($FePO_4$) having a trigonal crystal structure with point group $P_{3_21}$ based on the result of X-ray diffraction analysis shown in FIG. 1.

Diffraction Peaks Ascribable to Impurities Were Not Observed.

(2) Fabrication of Secondary Battery and its Charge/Discharge Characteristics

The cathode material, acetylene black as a conductivity imparting agent ["Denka Black" (registered trademark); product of Denki Kagaku Kogyo K.K, 50% pressed product], and PTFE (polytetrafluoroethylene) as a binder were prepared at a weight ratio of 70:25:5. The cathode material and acetylene black were mixed and ground in a ball mill (at a rotational speed of 200 rpm) for one day, and then mixed and kneaded with the PTFE. The resulting mixture was formed into a sheet with a thickness of 0.7 mm, and the sheet was punched out into disks with a diameter of 1.0 cm (area of 0.7854 $cm^2$) to form a pellet as a cathode.

A metal titanium screen and a metal nickel screen were joined as cathode and anode current collectors, respectively, to a coin-type battery case made of stainless steel (CR2032) by spot welding. The cathode and a metal lithium anode were assembled in the battery case with a porous polyethylene separator (Celgard 3501, a product of Celgard K.K.) therebetween. The battery case was filled with a suitable amount of 1 M solution of $LiPF_6$ in a 1:1 mixed solvent of dimethyl carbonate and ethylene carbonate as an electrolyte solution, and then sealed to fabricate a coin-type lithium secondary battery. All the assembling process was performed in a dried argon-purged glove box.

The secondary battery in which the cathode material was incorporated was repeatedly charged and discharged at a current densities of 0.127 $mA/cm^2$ and 0.5 $mA/cm^2$ per apparent area of the cathode pellet in an operating voltage range of +2.0 V to +4.5 V. About one-hour open circuit state was provided at each switching between charging and discharging.

Figure 2:
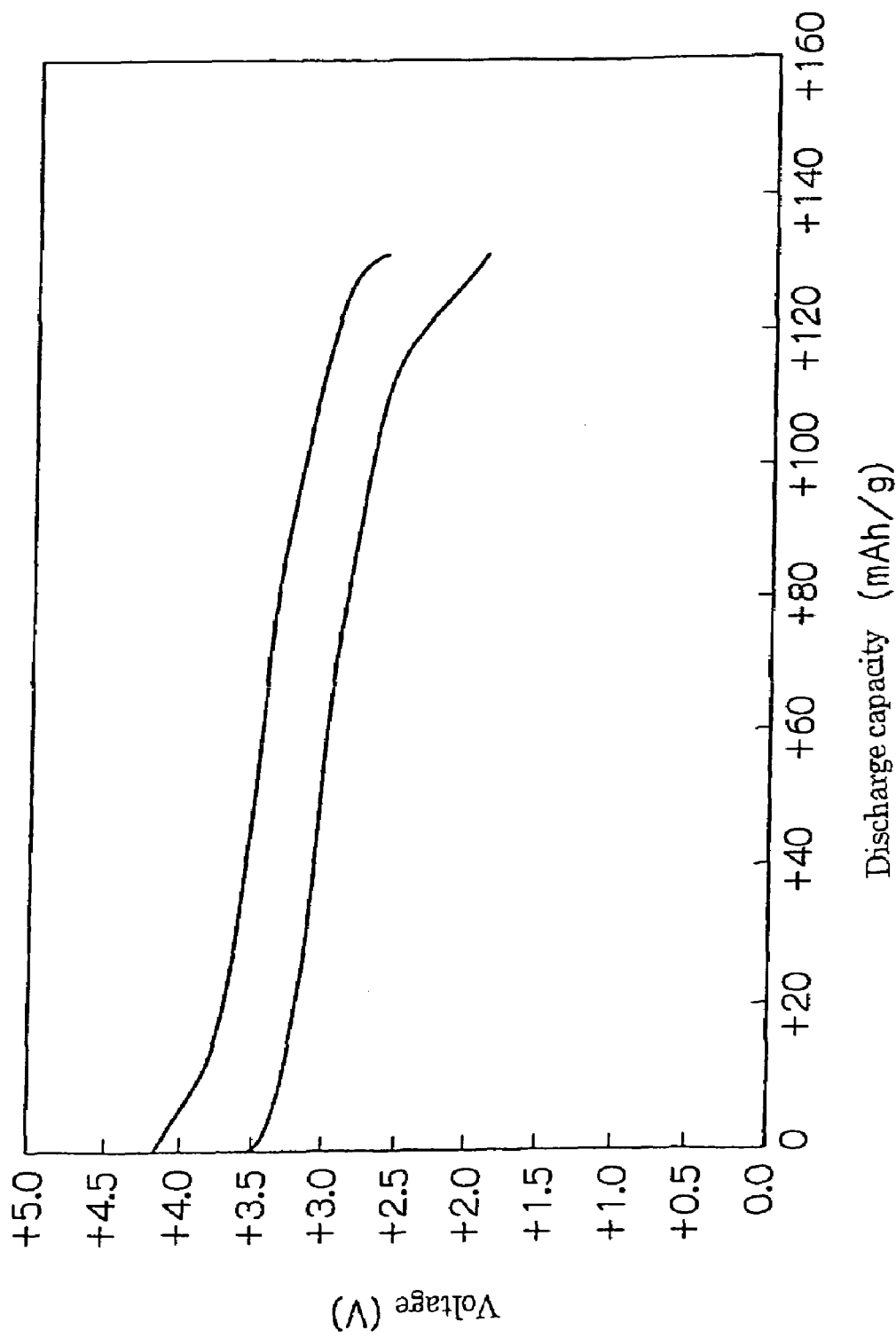
FIG. 2 is a graph showing the charge/discharge characteristics of a secondary battery obtained in Example 1.

The charge/discharge characteristics in the first cycle at a current density of 0.127 $mA/cm^2$ are shown in FIG. 2. The initial discharge capacity was 132 mAh/g. The charge/discharge characteristic curve was not flat unlike that of a battery using an olivine-type lithium iron (II) phosphate ($LiFePO_4$) known as a cathode material for a secondary battery.

Figure 3:
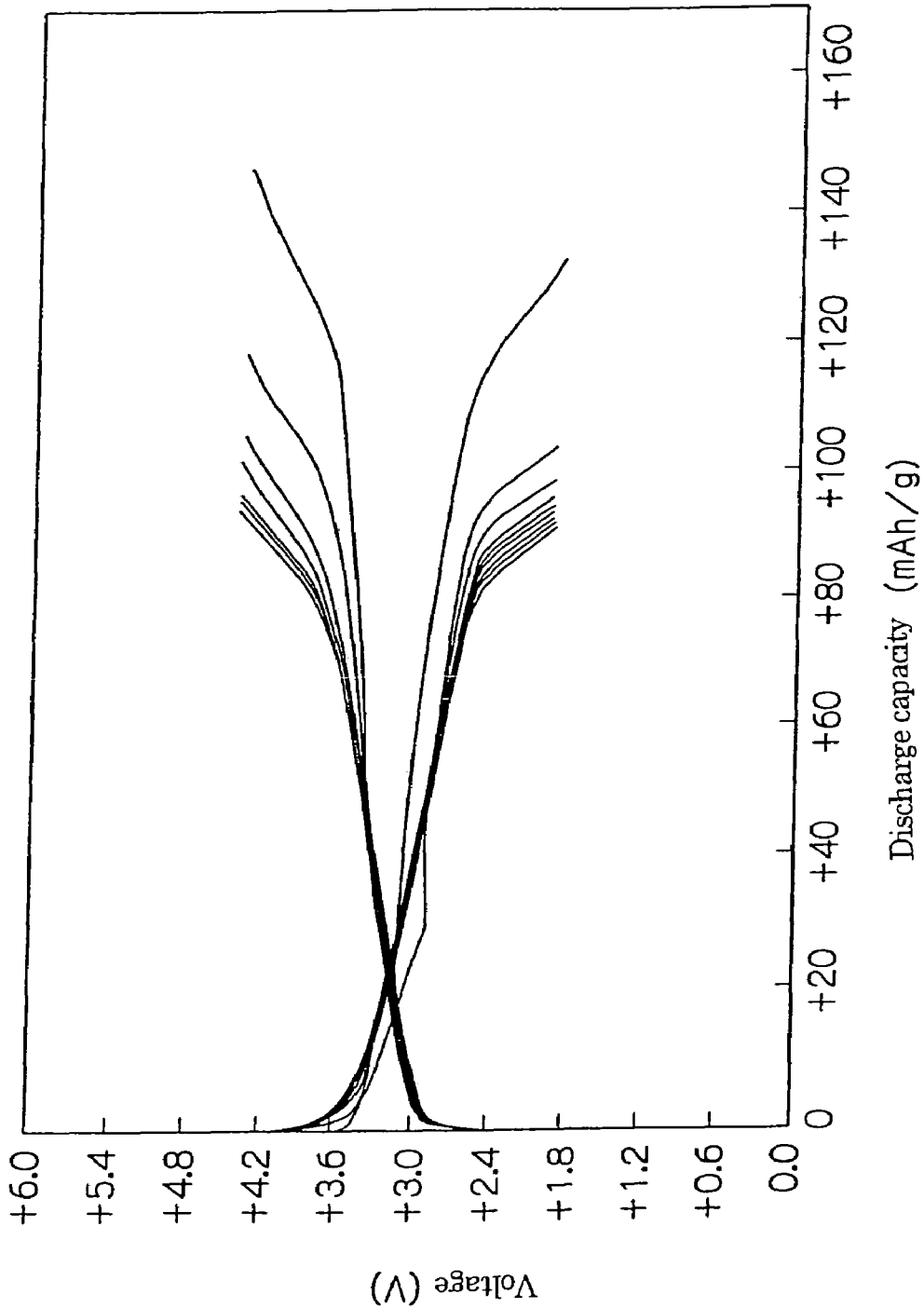
FIG. 3 is a graph showing the charge/discharge characteristics of the secondary battery obtained in Example 1.

The charge/discharge cycle characteristics at the same current density are shown in FIG. 3. The discharge capacity decreased as the number of cycle increased, and the lowest value was about 90 mAh/g.

Figure 4:
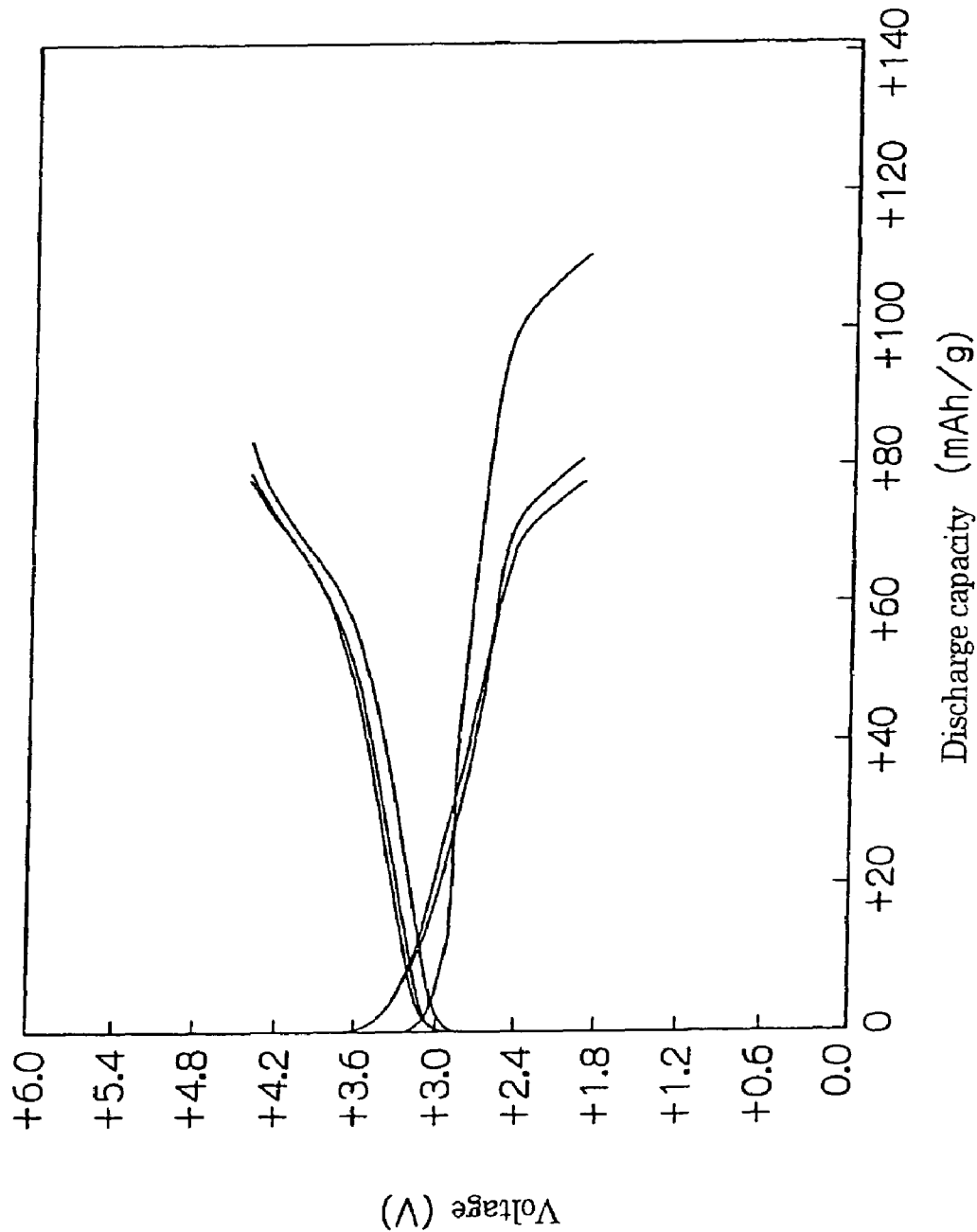
FIG. 4 is a graph showing the charge/discharge characteristics of the secondary battery obtained in Example 1.

The charge/discharge characteristics in the first to third cycles at a current density of 0.5 $mA/cm^2$ is shown in FIG. 4. The initial discharge capacity was 112 mAh/g. The capacity gradually decreased during the three cycles, and the lowest value was about 78 mAh/g.

When the cathode materials calcined at 550° C., 650° C. and 775° C., respectively, were compared, the cathode material calcined at 650° C. showed the highest discharge capacity.

EXAMPLE 2

Preparation of Cathode Material

Figure 5:
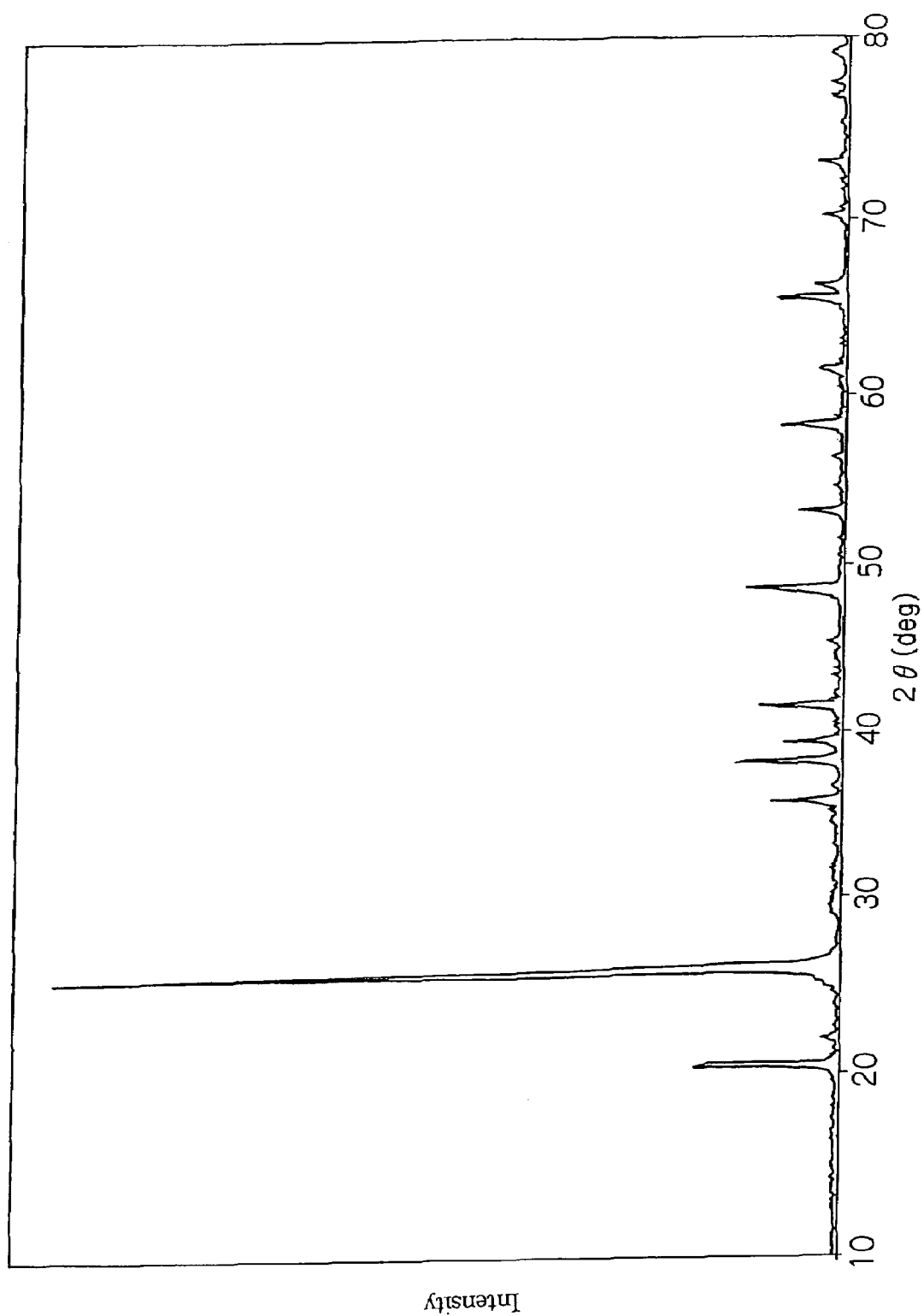
FIG. 5 is a graph showing the result of X-ray diffraction analysis of a cathode material obtained in Example 2.

A cathode material ($FePO_4$) was synthesized by the following procedure. An ingredient mixture of 3 g of iron powder (product of Wako Pure Chemical Industries, Ltd.; under 150 μm, purity: 85% or higher), 6.1794 g of ammonium dihydrogenphosphate (product of Wako Pure Chemical Industries, Ltd.) and 50 cc of water were mixed and ground in a ball mill (at a rotational speed of 200 rpm) for one day, and the reaction mixture was dried at 100° C. for one day to obtain a calcination precursor. After pulverization, the calcination precursor was placed in an alumina crucible and calcined at 650° C. under the presence of air for one day. A cathode material obtained as described above was identified as single-phase ferric phosphate ($FePO_4$) having a trigonal crystal structure with point group $P_{321}$ based on the result of X-ray diffraction analysis shown in FIG. 5. Diffraction peaks ascribable to impurities were not observed.

EXAMPLE 3

Preparation of Cathode Material

Figure 6:
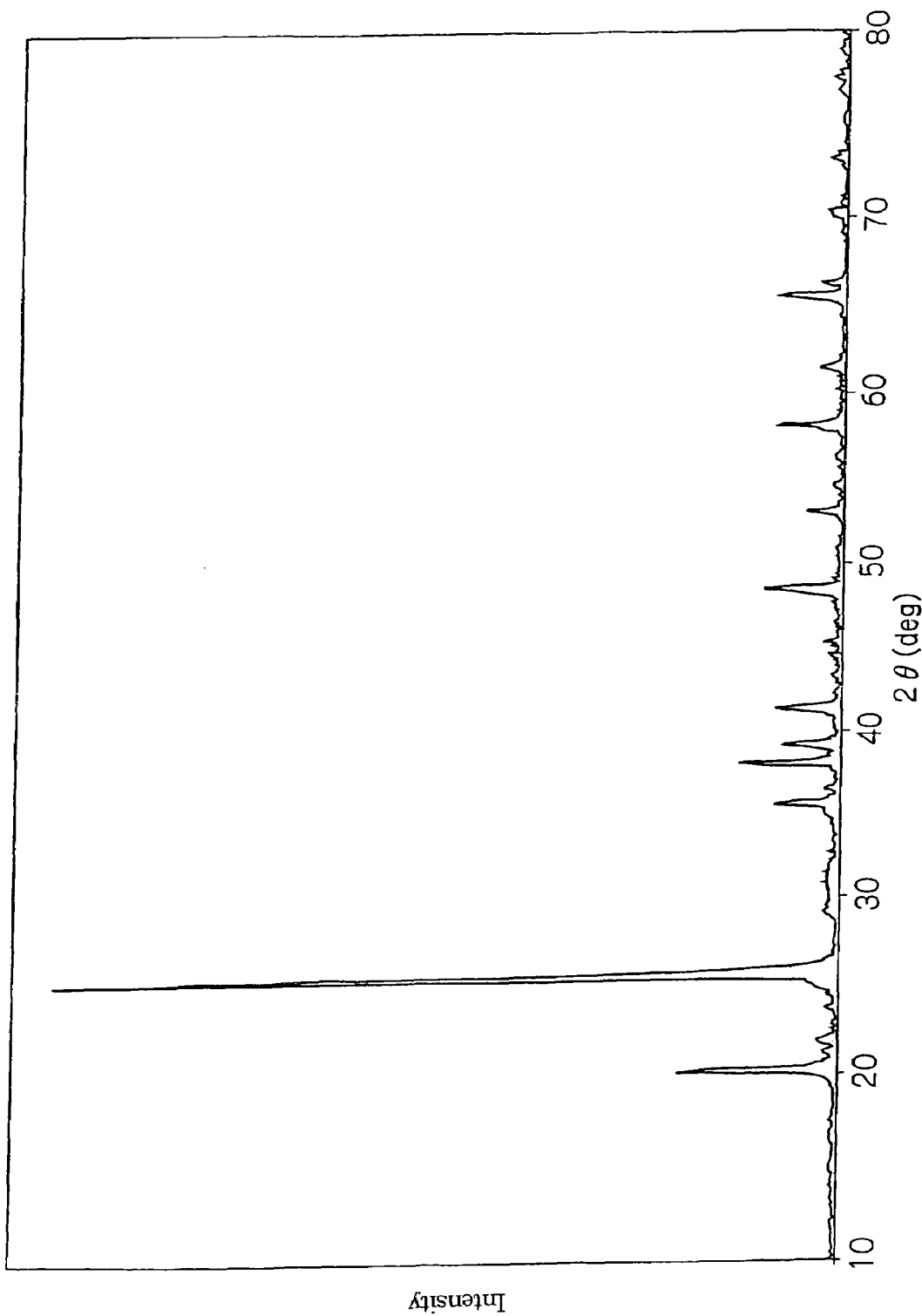
FIG. 6 is a graph showing the result of X-ray diffraction analysis of a cathode material obtained in Example 3.

A cathode material ($FePO_4$) was synthesized by the following procedure. An ingredient mixture of 11 g of iron powder (product of Wako Pure Chemical Industries, Ltd.; under 150 μm, purity: 85% or higher), 13.797 g of phosphorous pentoxide (product of Wako Pure Chemical Industries, Ltd.) and 200 cc of water were mixed and ground in a ball mill (at a rotational speed of 200 rpm) for one day, and the reaction mixture was dried at 100° C. for one day to obtain a calcination precursor. After pulverization, the calcination precursor was placed in an alumina crucible and calcined at 650° C. under the presence of air for one day. A cathode material obtained as described above was identified as single-phase ferric phosphate ($FePO_4$) having a trigonal crystal structure with point group $P_{321}$ based on the result of X-ray diffraction analysis shown in FIG. 6. Diffraction peaks ascribable to impurities were not observed.

EXAMPLE 4

Preparation of Cathode Material

A cathode material ($FePO_4$) was synthesized by the following procedure.

200 ml of pure water was added to a stoichiometric mixture of iron powder, 11.169 g (product of Wako Pure Chemical Industries, Ltd.; under 150 μM, purity: 85% or higher) and phosphorous pentoxide, 14.483 g (product of Wako Pure Chemical Industries, Ltd.), and the resulting mixture was mixed and ground in a planetary ball mill at a rotational speed of 200 rpm for one day. The content was dried, and then divided into portions, which were calcined at 100° C., 200° C., 350° C., 500° C. and 650° C., respectively, in atmosphere for 12 hours. Each of the obtained cathode materials was pulverized in an agate mortar. Then, each cathode material was formed into a cathode, and a coin-type lithium secondary battery was fabricated using a metal lithium anode in the same manner as in Example 1.

Figure 7:
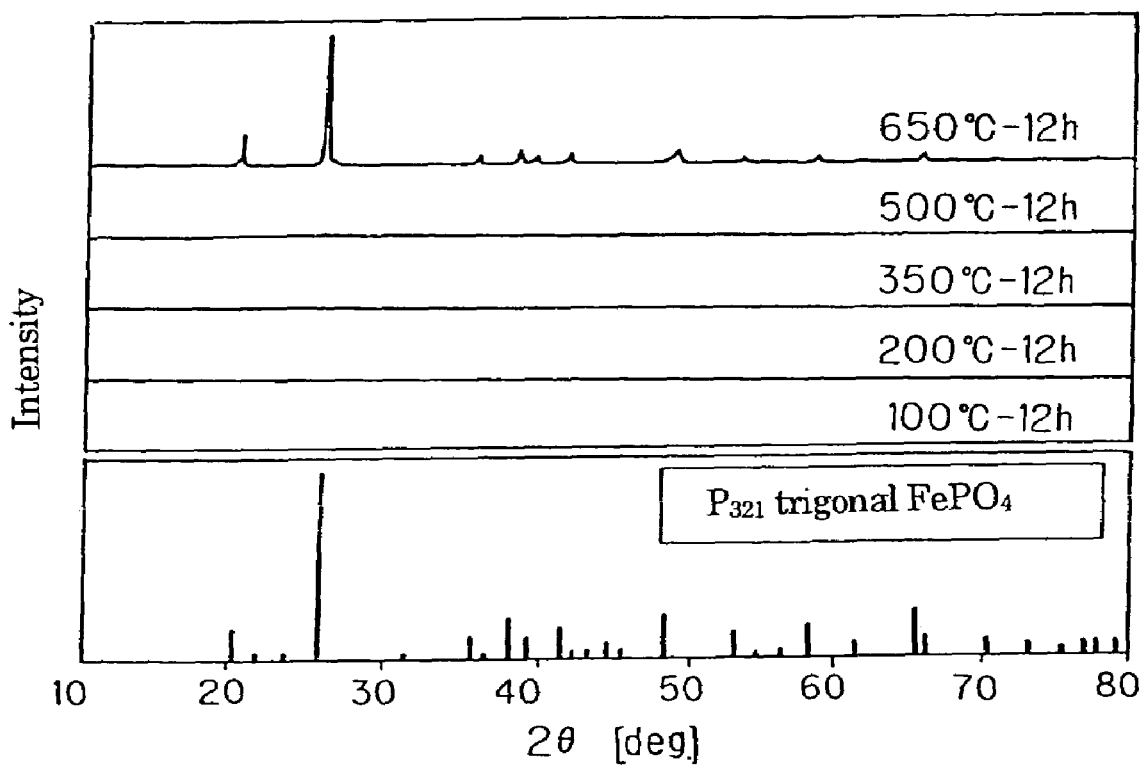
FIG. 7 is a graph showing the result of X-ray diffraction analysis of cathode materials calcined at different temperatures in Example 4.

The results of X-ray diffraction analysis of the synthesized cathode materials are shown in FIG. 7. As is clear from FIG. 7, the samples calcined at a temperature between 100° C. and lower than 500° C. had an amorphous structure with no diffraction peaks, and the sample calcined at 500° C. was mostly amorphous but slightly crystallized into a trigonal crystal structure with point group $P_{321}$. On the other hand, the sample calcined at 650° C., the same calcination temperature as in Example 3, had a crystal structure with point group $P_{321}$.

Figure 8:
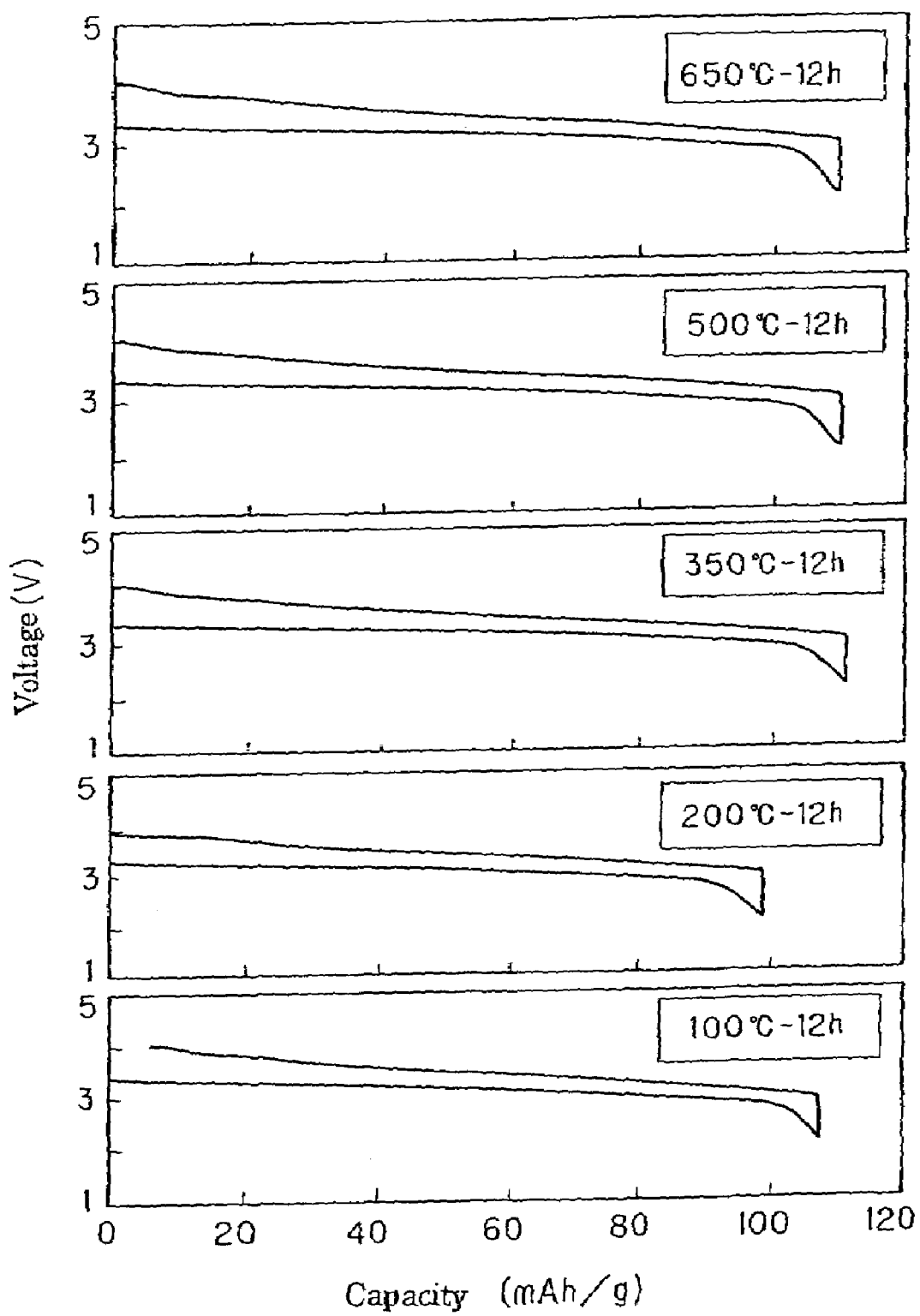
FIG. 8 is a graph showing the charge/discharge characteristics of secondary batteries using the cathode materials calcined at different temperature in Example 4.

The charge/discharge characteristics in the first cycle of the coin-type lithium secondary batteries using the cathode materials are shown in FIG. 8. The batteries were alternately charged and discharged between 2 and 4V at a temperature of 25° C. and a current density per apparent area of 0.2 $mA/cm^2$. Almost no difference in charge/discharge profile was observed between the amorphous and crystalline samples, and their discharge voltage profiles were apparently different from the flat profile which lithium iron phosphate having an olivine-type crystal structure (orthorhombic Pnma) showed, in which both oxidized and reduced forms coexist during charging and discharging reactions, and showed monotonously decreasing curves which are seen in the case of homogeneous phase reaction.

In this example, when the charge/discharge characteristics were measured on the samples synthesized from inexpensive starting materials of iron powder and phosphorous pentoxide at synthesis temperatures between 100 to 650° C., the samples calcined at temperatures of 350° C. or higher showed a maximum capacity of 115 mAh/g (see FIG. 8), which largely exceeds the capacity of 40 mAh/g shown in the conventional report (cited before). Also, it should be noted that the cathode material obtained by calcination at a very low temperature of 100° C. showed a discharge capacity higher than 100 mAh/g.

Further, the results of X-ray diffraction analysis of the cathode materials taken out of the coin-type lithium batteries after discharging were much the same as those immediately after production (the results are not shown), which indicates that the charge and discharge did not cause formation of a new phase. This indicates that the cathode materials obtained in this example were all stable during charge and discharge.

When TG (thermogravimetry) of the cathode materials was conducted, weight loss by thermal dehydration was hardly observed for the cathode materials calcined at temperatures of 200° C. or higher. However, according to the result of Fourier infrared absorption spectrophotometry, the absorption of the O—H—O deformation mode at 1600 $cm^{-1}$ attributed to the existence of crystal water completely disappeared only in the crystalline sample calcined at 650° C. To keep the performance of a lithium battery stably over a long period of time, it is preferred that no water exist in the battery. Thus, from the point of view of the long-term performance, calcination at 650° C. is considered to be advantageous.

EXAMPLE 5

Acetylene black (product of Denki Kagaku Kogyo K.K, 50% pressed product) was added to the cathode material $FePO_4$ calcined at 650° C. and having a crystal structure with point group $P_{321}$ that was synthesized in Example 4 in an amount of 25% by weight based on the total weight of the mixture. The mixture was ground and mixed in a planetary ball mill at 200 rpm for one day to obtain a cathode material including cathode material particles coated with acetylene black (which will be hereinafter referred to as "carbon composite cathode material"). Then, the cathode material was formed into a cathode, and a coin-type lithium secondary battery was fabricated using a metal lithium anode in the same manner as in Example 1.

Figure 9:
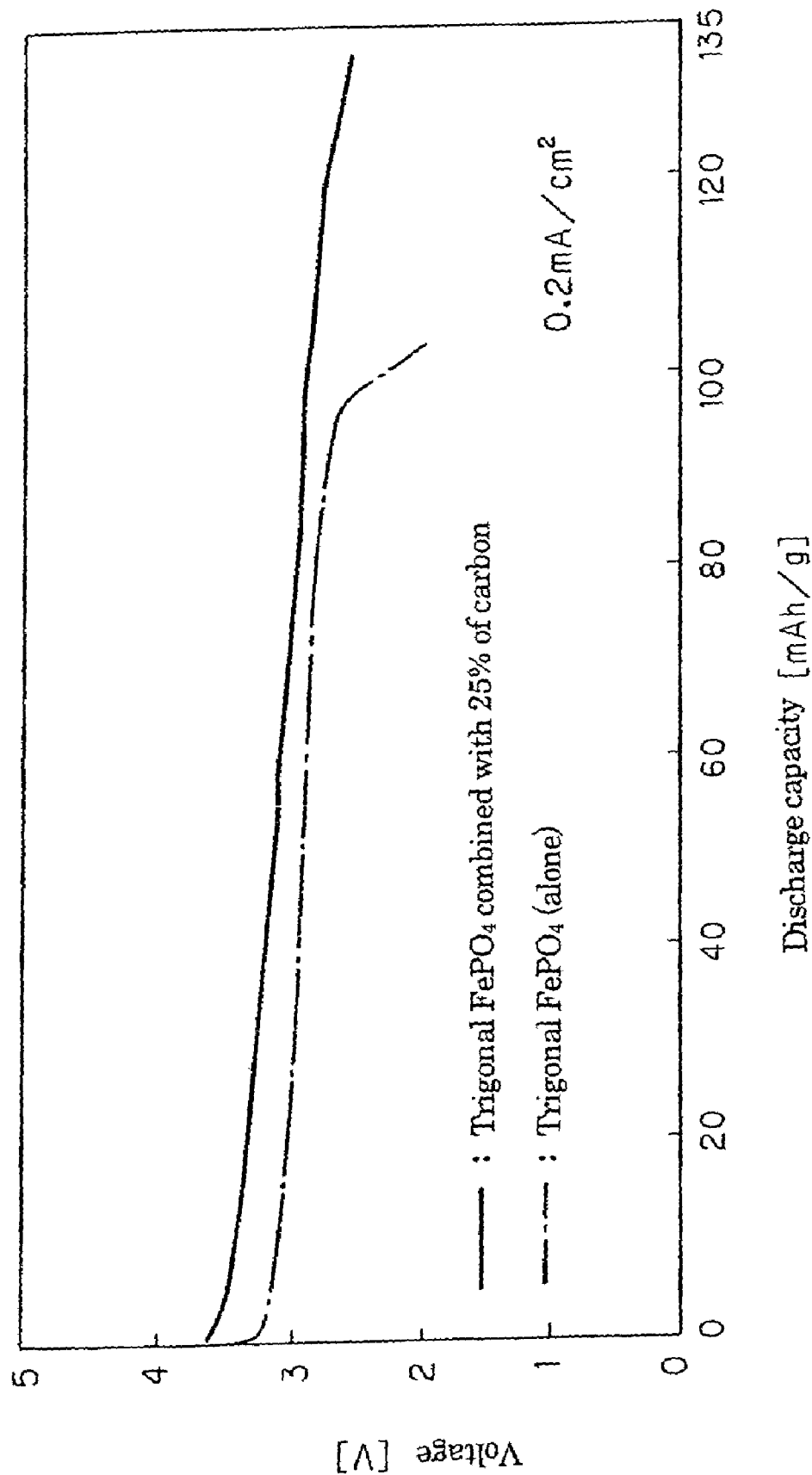
FIG. 9 is a graph showing the charge/discharge characteristics of a secondary battery obtained in Example 5.

A charge and discharge test was conducted on the coin-type secondary lithium battery. The result is shown in FIG. 9. The batteries were alternately charged and discharged between 2.6 and 4V at a temperature of 25° C. and a current density per apparent area of 0.2 $mA/cm^2$. In FIG. 9, the result of the test conducted on a cathode material calcined at 650° C. but not combined with carbon (which was alternately charged and discharged between 2.0 and 4V) is also shown.

FIG. 9 indicate that when combined with carbon, the $FePO_4$ cathode material had significantly improved discharge capacity as compared with a cathode material not combined with carbon and showed as high a value as about 130 mAh/g. This is considered to be because the combination with carbon improves the surface conductivity of the $FePO_4$ cathode material as a cathode active material and significantly enhances the utilization ratio of the positive active material. This indicates that the combination with carbon is effective to improve the performance of a lithium battery using $FePO_4$ as a cathode active material.

EXAMPLE 6

Preparation of Cathode Material

A cathode material ($FePO_4$) was synthesized by the following procedure.

200 ml of pure water was added to a stoichiometric mixture of iron powder, 11.169 g (product of Wako Pure Chemical Industries, Ltd.; under 150 μm, purity: 85% or higher) and phosphorous pentoxide, 14.483 g (product of Wako Pure Chemical Industries, Ltd.), and the resulting mixture was charged in a glass Erlenmeyer flask equipped with a water-cooled condenser and refluxed with a hot stirrer at 100° C. for three days (this method in this Example will be hereinafter referred to as "reflux method"). The reaction mixture was taken out and dried, and then calcined in atmosphere at 650° C. for 24 hours. The obtained cathode materials was pulverized in an agate mortar. Then, the cathode material was formed into a cathode, and a coin-type lithium secondary battery was fabricated using a metal lithium anode in the same manner as in Example 1.

Figure 10:
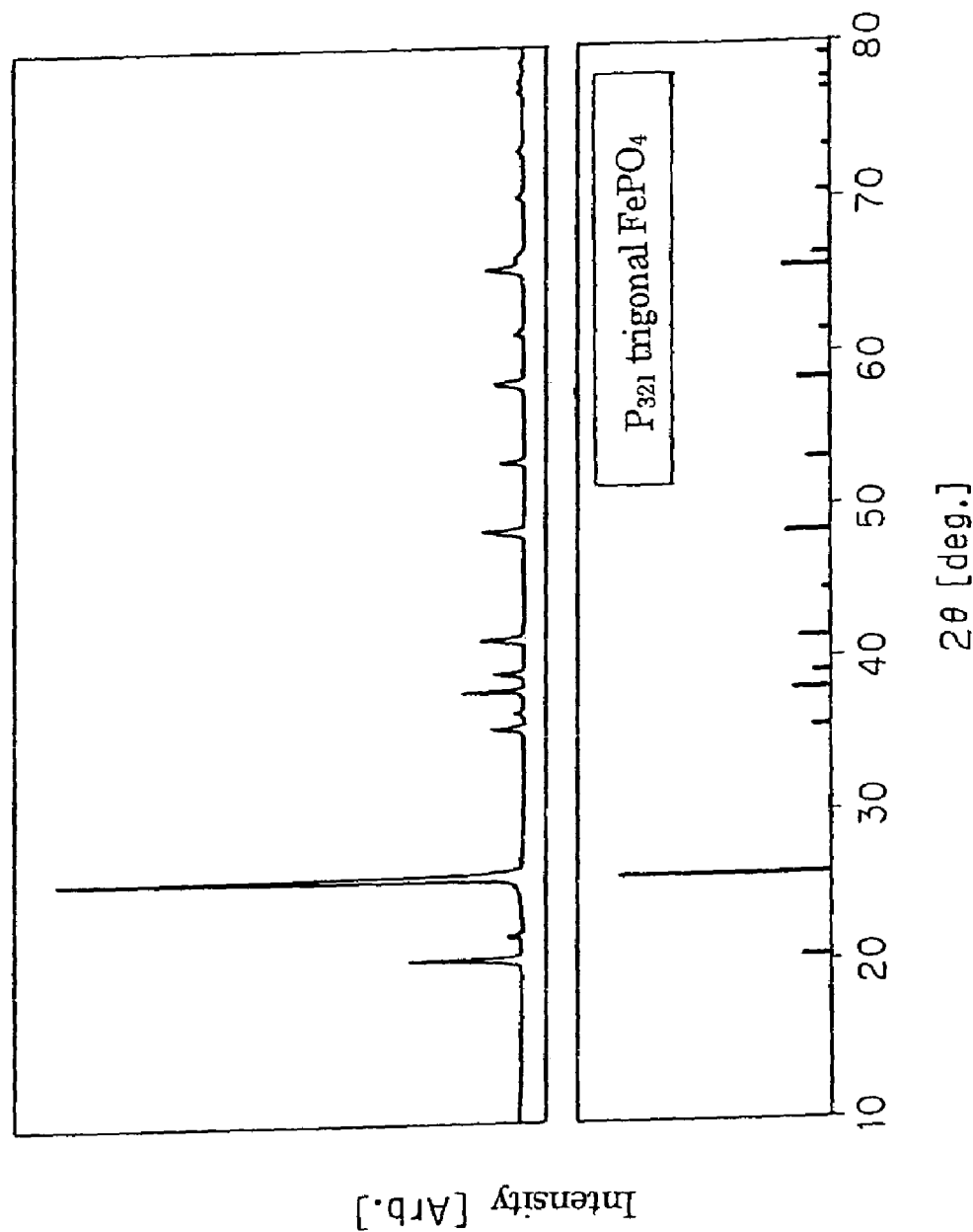
FIG. 10 is a graph showing the result of X-ray diffraction analysis of a cathode material obtained in Example 6.

The result of X-ray diffraction analysis of the synthesized cathode material is shown in FIG. 10. FIG. 10 indicates that it is possible to obtain $FePO_4$ having a crystal structure with point group $P_{321}$ by a reflux method as in the case with the sample of Example 4 obtained by grinding and reacting the ingredients in a planetary ball mill and calcining the reaction mixture at 650° C.

A charge and discharge test was conducted on the coin-type lithium secondary battery using the cathode material under the same conditions as in Example 4, a discharge voltage profile similar to that of the sample calcined at 650° C. shown in the top box in FIG. 8 and a discharge capacity of 115 mAh/g were obtained (illustration of the measurement result is omitted).

This indicates that a calcination precursor equivalent to the one obtained by grinding, dissolving and reacting the ingredients in a planetary ball mill or the like can be synthesized by a reflux method, and that a high-performance cathode material can be obtained by calcining the calcination precursor.

INDUSTRIAL APPLICABILITY

According to the method of the present invention, ferric phosphate ($FePO_4$) as a cathode material for a secondary battery can be produced reliably and easily. The cathode material produced by the method of the present invention is suitably used as a cathode material for a metal lithium battery, for example.

The invention claimed is:

1. A method comprising the steps of mixing a compound selected from the group consisting of phosphoric acid ($H_3PO_4$), phosphorous pentoxide ($P_2O_5$), ammonium dihydrogenphosphate ($NH_4H_2PO_4$), and diammonium hydrogenphosphate [$(NH_4)_2HPO_4$] in a solution with metal iron to cause dissolution and reaction of the metal iron in an acidic solution, and calcining the reaction mixture to synthesize ferric phosphate cathode material for a lithium battery.

2. A method comprising the steps of reacting a compound selected from the group consisting of phosphoric acid ($H_3PO_4$), phosphorous pentoxide ($P_2O_5$), ammonium dihydrogenphosphate ($NH_4H_2PO_4$), and diammonium hydrogenphosphate [$(NH_4)_2HPO_4$] in a solution with metal iron while grinding the mixture of the compound and the metal iron in an aqueous solution to renew surfaces of the metal iron, and calcining the reaction mixture to synthesize ferric phosphate cathode material for a lithium battery.

3. A method comprising the steps of adding a conductive carbon to the cathode material produced by the method according to any one of claims 1 or 2, and pulverizing and mixing the mixture.

4. A lithium battery using a cathode material produced by the method according to any one of claims 1 or 2 as a constituent component.

5. A lithium battery using a cathode material produced by the method according to claim 3 as a constituent component.

* * * * *